United States Patent
Lu

(10) Patent No.: US 8,014,116 B2
(45) Date of Patent: Sep. 6, 2011

(54) COMPUTER SYSTEM AND POWER CONTROL APPARATUS THEREOF

(75) Inventor: Chun-Ying Lu, Taipei (TW)

(73) Assignee: Inventec Corporation, Taipei (TW)

( * ) Notice: Subject to any disclaimer, the term of this patent is extended or adjusted under 35 U.S.C. 154(b) by 357 days.

(21) Appl. No.: 12/414,982

(22) Filed: Mar. 31, 2009

(65) Prior Publication Data

US 2010/0157500 A1 Jun. 24, 2010

(30) Foreign Application Priority Data

Dec. 22, 2008 (TW) ................ 97150120 A

(51) Int. Cl.
*H02H 5/04* (2006.01)
(52) U.S. Cl. ...................................... 361/103
(58) Field of Classification Search ............ 361/103
See application file for complete search history.

(56) References Cited

U.S. PATENT DOCUMENTS 7,353,133 B2 * 4/2008 Park .............................. 702/130
7,787,229 B2 * 8/2010 Deng et al. ..................... 361/103
* cited by examiner

*Primary Examiner* — Dharti Patel
(74) *Attorney, Agent, or Firm* — J.C. Patents

(57) ABSTRACT

A power control apparatus is disclosed. The power control apparatus includes a temperature sensor, a first voltage converter, an over-temperature protection, a reset unit and a second voltage converter. The temperature sensor is for sensing a measured temperature to output a sensing signal. The first voltage converter converts the power voltage of a computer system into a first voltage. The over-temperature protection unit receives the first voltage and decides whether or not outputting the first voltage according to the sensing signal. When the reset unit has received the first voltage from the over-temperature protection unit, the reset unit decides whether or not to produce a reset signal according to the level of the power voltage. The second voltage converter is for producing a start signal to enable the embedded controller according to the reset signal.

18 Claims, 2 Drawing Sheets

COMPUTER SYSTEM AND POWER CONTROL APPARATUS THEREOF

CROSS-REFERENCE TO RELATED APPLICATION

This application claims the priority benefit of Taiwan application serial no. 97150120, filed on Dec. 22, 2008. The entirety of the above-mentioned patent application is hereby incorporated by reference herein and made a part of specification.

BACKGROUND OF THE INVENTION

1. Field of the Invention

The present invention generally relates to a computer system and the power control apparatus thereof, and more particularly, to a computer system and the power control apparatus thereof with over-temperature protection mechanism.

2. Description of Related Art

FIG. 1 is a localized diagram of a conventional computer system. Referring to FIG. 1, a conventional computer system 100 includes a temperature sensor 110, an embedded controller 120, two resistors R11 and R12, a capacitor C1 and a diode Z1. In a normal situation of the computer system 100, the temperature sensor 110 does not produce a sensing signal STH1 with a low logic-level, and a voltage V1 taking a conductive path between the resistor R12 and the capacitor C1 enables the embedded controller 120 normally working.

On the contrary, when the CPU or an operation component in the conventional computer system 100 gets overheat, the temperature sensor 110 produces a sensing signal STH1 with a low logic-level, and the embedded controller 120 quits to normally work, which further shuts down the computer system 100 to prevent the computer from running in the overheat status. Meanwhile, the embedded controller 120 would receive a reset signal SRE1 through the diode Z1. When the reset signal SRE1 is switched into the low logic-level, the embedded controller 120 fails normally working and shuts down the computer as well. The capacitor C1 serves for providing a path for discharging or charging the above-mentioned operation mechanism.

It should be noted that the above-mentioned prior art features by using the sensing signal STH1 produced by the temperature sensor 110 so as to enable or disable the embedded controller 120 to further achieve the overheat protection mechanism. However, the above-mentioned scheme has two disadvantages. First, after the conventional computer system 100 is shut down due to the low logic-level of the sensing signal STH1, a user may want to restart the computer by pressing the starting key of the computer system. At the time, if the measured temperature still keeps equal to or over 85° C., the temperature sensor 110 would continue producing the sensing signal STH1 with the low logic-level, which forces the computer system 100 to be shut down again.

Next, after the conventional computer system 100 is shut down due to the low logic-level of the sensing signal STH1, before the voltage V1 received by the embedded controller 120 is completely discharged, the embedded controller 120 keeps normally working; i.e., the temperature sensor 110 controlled by the embedded controller 120 keeps normally working. At the time, if a user presses the starting key of the computer system, the conventional computer system 100 would be compellably shut down since the temperature sensor 110 is working normally to directly output the sensing signal STH1 with the low logic-level.

In short, the above-mentioned two situations result in forcing the computer system continuously shut down after the computer is started, which gives the user a wrong message that the computer gets fault or encourages the user to start the computer again and again leading a shorter lifetime of the computer.

SUMMARY OF THE INVENTION

Accordingly, the present invention is directed to a power control apparatus, wherein a reset signal produced by the temperature sensor is used to control a over-temperature protection unit and further indirectly control the operation of an embedded controller. In this way, the computer system would have sufficient time to make a second voltage received by the embedded controller discharged.

The present invention is also directed to a computer system able to avoid the computer system from reiteratively starting operations of the computer after a pre-designed over-temperature protection mechanism is started and to avoid the user from having a wrong message that the computer gets fault.

The present invention provides a power control apparatus for controlling an embedded controller to be enabled or disabled in a computer system. The power control apparatus includes a temperature sensor, a first voltage converter, an over-temperature protection unit, a reset unit and a second voltage converter. The temperature sensor herein is for sensing a measured temperature so as to output a sensing signal. The first voltage converter is for converting a power voltage in the computer system into a first voltage.

The over-temperature protection unit is for receiving the first voltage and deciding whether or not to output the first voltage according to the sensing signal. When the reset unit has received the first voltage from the over-temperature protection unit, the reset unit would decide whether or not to produce a reset signal according to the level of the power voltage. Further, the second voltage converter produces a start signal to enable the embedded controller according to the reset signal.

In an embodiment of the present invention, the above-mentioned power control apparatus further includes a third voltage converter for converting the power voltage of the computer system into a second voltage serving as the operation voltage of the embedded controller.

In an embodiment of the present invention, the above-mentioned over-temperature protection unit includes a switch, wherein the first terminal of the switch receives the first voltage, the second terminal thereof is electrically connected to the reset unit and the control terminal thereof is for receiving the sensing signal to decide whether or not the first terminal and the second terminal thereof are conductive therebetween according to the sensing signal.

In an embodiment of the present invention, when the measured temperature is within a safety range of the temperature sensor, the above-mentioned temperature sensor outputs the sensing signal with a first level so that the over-temperature protection unit outputs the first voltage; when the measured temperature is beyond the safety range of the temperature sensor, the temperature sensor outputs the sensing signal with a second level so that the over-temperature protection unit ceases outputting the first voltage.

The present invention also provides a computer system, which includes an embedded controller and the above-mentioned power control apparatus. The power control apparatus herein is electrically connected to the embedded controller to enable or disable the embedded controller.

Based on the description above, the present invention uses the sensing signal produced by the temperature sensor to control the over-temperature protection unit and thereby indirectly control the operations of the reset unit, the voltage converters and the embedded controller. After the computer system enters a pre-designed over-temperature protection mechanism, the embedded controller needs longer time to be restarted. In this way, the computer system wins sufficient time to make the second voltage received by the embedded controller discharged and the system is able to dissipate the heat thereof in a longer duration. In other words, the present invention can avoid reiteratively starting operations of the computer system after entering the over-temperature protection mechanism and prevent the user from having a wrong message that the computer is damaged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
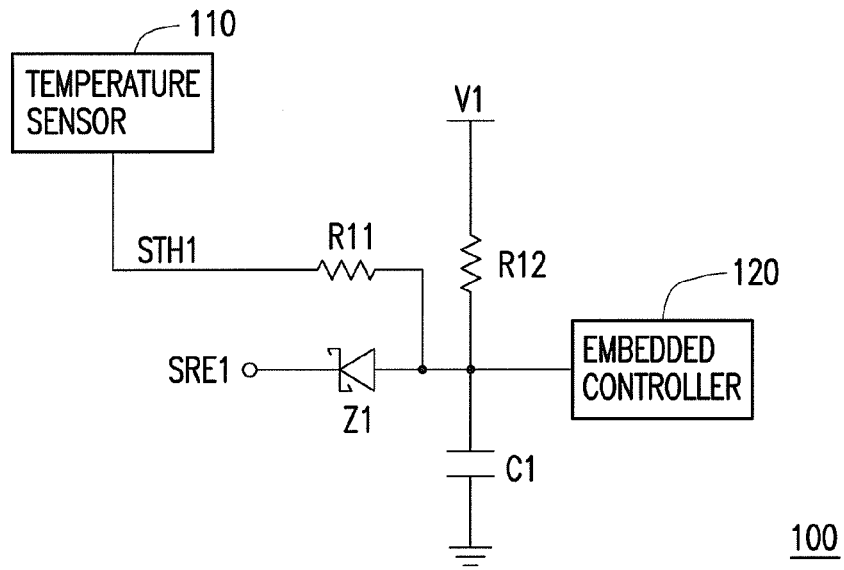
FIG. 1 is a localized diagram of a conventional computer system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
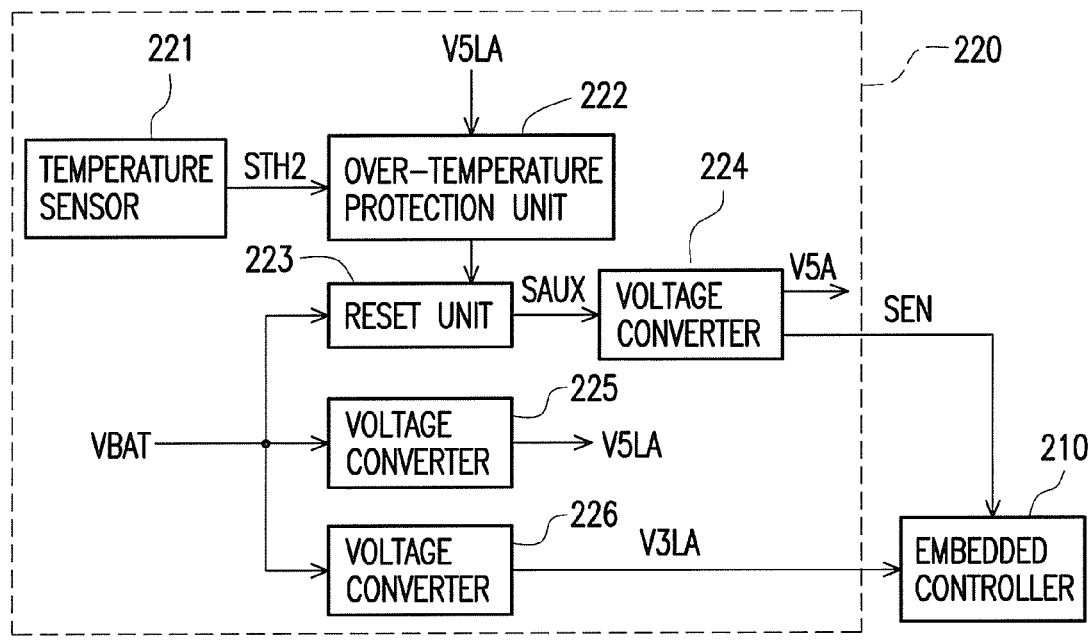
FIG. 2 is a localized block diagram showing the structure of a computer system according to an embodiment of the present invention.

FIG. 2 is a localized block diagram showing the structure of a computer system according to an embodiment of the present invention. Referring to FIG. 2, a computer system 200 includes an embedded controller 210 and a power control apparatus 220, wherein the power control apparatus 220 is electrically connected to the embedded controller 210 for enabling or disabling the embedded controller 210, so that the computer system 200 can be normally started and shut down. During starting the computer system 200, the embedded controller 210 enables a temperature sensor 221 working normally.

The power control apparatus 220 includes a temperature sensor 221, an over-temperature protection unit 222, a reset unit 223 and a plurality of voltage converters 224-226. The over-temperature protection unit 222 herein is electrically connected to the temperature sensor 221, the reset unit 223 and the voltage converter 225. The voltage converter 224 is electrically connected to the reset unit 223 and the embedded controller 210. The voltage converter 226 is electrically connected to the embedded controller 210.

In terms of the operations of the components, the voltage converter 225 converts a power voltage VBAT of the computer system 200 into a first voltage V5LA. The temperature sensor 221 is for sensing the measured temperature of an operation component in the computer system 200, for example, the temperature of a CPU or the chip thereof, a component or a motherboard, so as to output a sensing signal STH2. The over-temperature protection unit 222 receives the first voltage V5LA for deciding whether or not to output the first voltage V5LA according to the sensing signal STH2. In addition, when the reset unit 223 has received the first voltage V5LA from the over-temperature protection unit 222, the reset unit 223 would decide whether or not to produce a reset signal SAUX according to the level of the power voltage VBAT, and at the time, the first voltage V5LA serves as the operation voltage of the reset unit 223.

Figure 3:
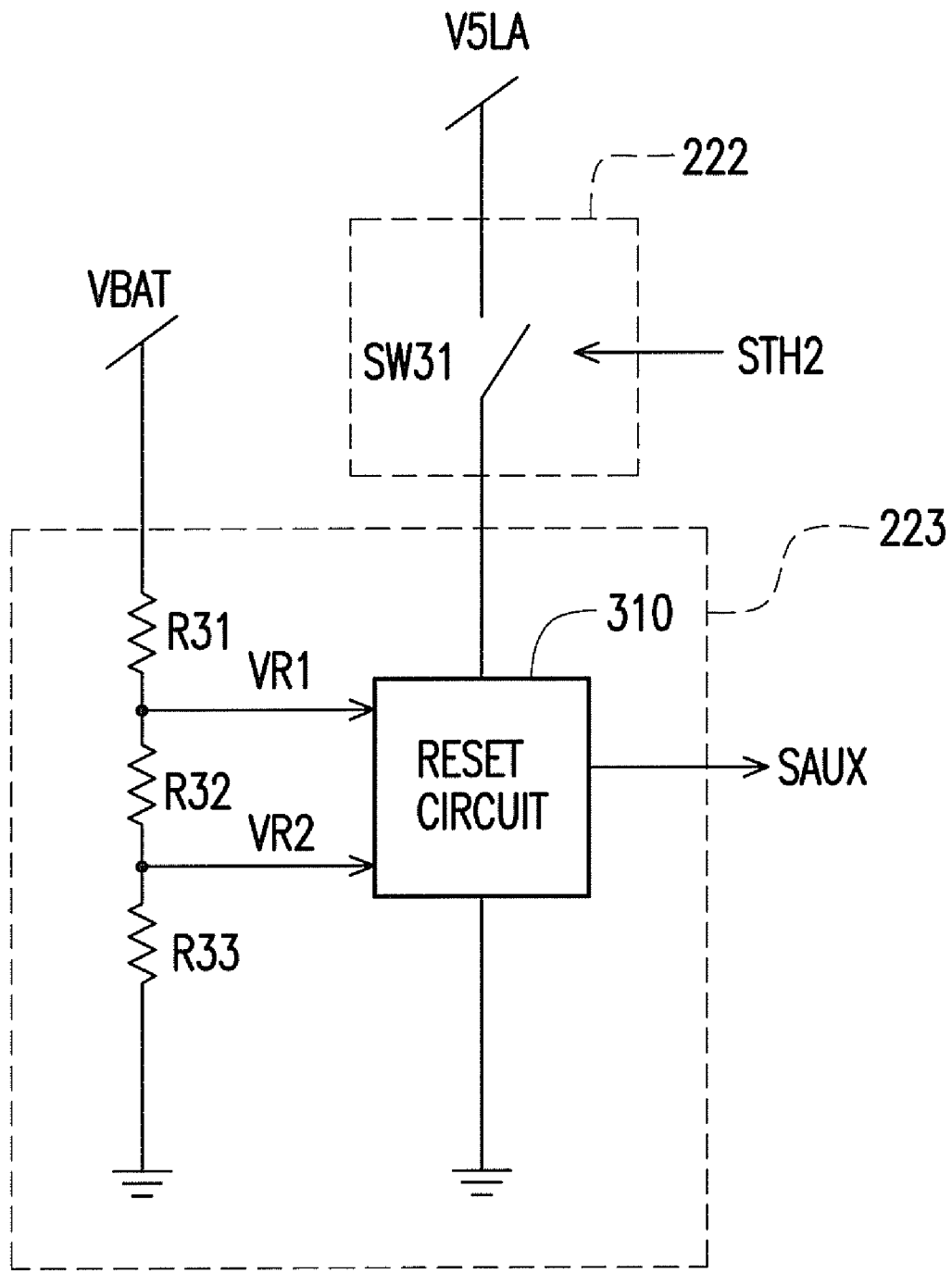
FIG. 3 is a diagram showing the detail architecture of the over-temperature protection unit 222 and the reset unit 223 of FIG. 2.

Taking an example, FIG. 3 is a diagram showing the detail architectures of the over-temperature protection unit 222 and the reset unit 223 of FIG. 2. In the embodiment, as shown in FIG. 3, the over-temperature protection unit 222 is implemented by a switch SW3 1, wherein the first terminal of the switch SW31 receives the first voltage V5LA, the second terminal thereof is electrically connected to the reset unit 223 and the control terminal thereof is for receiving the sensing signal STH2.

While the computer system 200 is running and the measured temperature of the operation component is within a safety range of the temperature sensor 221, i.e., the computer system 200 works normally, the temperature sensor 221 would output a sensing signal STH2 with a first level (for example, logic 1). Meanwhile, the switch SW31 is turned on between the first terminal and second terminal thereof according to the sensing signal STH2 so that the first voltage V5LA is output to the reset unit 223 and the reset circuit 223 can normally work. On the contrary, when the measured temperature of the computer system 200 is beyond the safety range of the temperature sensor 221, i.e., the computer system 200 gets overheat, the temperature sensor 221 would output the sensing signal STH2 with a second level (for example, logic 0). Meanwhile, the switch SW31 is turned off and ceases outputting the first voltage V5LA to the reset unit 223, so that the reset unit 223 quits working in the status lacking the operation voltage.

Continuing to FIG. 3, in the embodiment, the reset unit 223 herein includes a plurality of resistors R31-R33 and a reset circuit 310. The first end of the resistor R31 receives the power voltage VBAT and the second end thereof is for generating a first reference voltage VR1. The first end of the resistor R32 is electrically connected to the second end of the resistor R31 and the second end thereof is for generating a second reference voltage VR2. The first end of the resistor R33 is electrically connected to the second end of the resistor R32 and the second end of the resistor R33 is electrically connected to a ground terminal. The reset circuit 310 is electrically connected to the second ends of the resistors R31 and R32, the over-temperature protection unit 222 and the voltage converter 224.

In terms of the operations of the components, when the computer system 200 normally works, the over-temperature protection unit 222 durably outputs the first voltage V5LA, so that the reset circuit 310 is operated with the first voltage V5LA. Meanwhile the reset circuit 310 respectively compares the first reference voltage VR1 and the second reference voltage VR2 with a preset voltage in the reset circuit 310 to decide whether or not to produce the reset signal SAUX according to the comparison result.

In the embodiment, when the first reference voltage VR1 and the second reference voltage VR2 are, for example, respectively greater than the preset voltage, the reset circuit 310 would produce the reset signal SAUX; when the first reference voltage VR1 and the second reference voltage VR2 are, for example, respectively less than the preset voltage, the reset circuit 310 would not produce the reset signal SAUX. In other words, when the computer system 200 normally works, in response to an excessive low power voltage VBAT, the levels of the first reference voltage VR1 and the second reference voltage VR2 would be accordingly reduced, which further makes the reset circuit 310 cease producing the reset signal SAUX.

On the other hand, when the computer system 200 gets overheat, the over-temperature protection unit 222 ceases outputting the first voltage V5LA so that the reset circuit 310 is unable to normally work; i.e., when the computer system 200 gets overheat, the reset circuit 310 ceases producing the reset signal SAUX as well.

Continuing to FIG. 2, the voltage converter 224 is for producing a start signal SEN to enable the embedded controller 210 according to the reset signal SAUX; the voltage converter 226 is for converting the power voltage VBAT of the computer system 200 into a second voltage V3LA serving as the operation voltage of the embedded controller 210. In other words, when the computer system 200 normally works and the power voltage VBAT thereof is sufficient, the reset unit 223 durably outputs the reset signal SAUX and the voltage converter 224 durably produces the start signal SEN. In this way, the embedded controller 210 is operated with the second voltage V3LA and starts performing the corresponding operation according to the start signal SEN.

On the other hand, when the computer system 200 gets overheat, the reset circuit 310 ceases producing the reset signal SAUX and the voltage converter 224 also ceases producing the start signal SEN. In this way, the embedded controller 220 is unable to normally work, which shuts down the computer system 200 to achieve the overheat protection mechanism.

It should be noted that after the computer system 200 enters the status of the overheat protection mechanism, if the user presses a starting key (not shown) of the computer system 200 at the time, only after the successive operations of the voltage converter 226, the over-temperature protection unit 222, the reset unit 223 and the voltage converter 224, the embedded controller 210 of the computer system 200, the embedded controller 210 can normally work. In this way, the computer system 200 wins sufficient time to discharge the second voltage V3LA received by the embedded controller 210 and longer time to dissipate the heat thereof.

In addition, in the embodiment, the voltage converter 224 further generates a third voltage V5A according to the reset signal SAUX, wherein the power voltage VBAT is greater than the first voltage V5LA, the first voltage V5LA is greater than the second voltage V3LA and the second voltage V3LA is greater than the third voltage V5A. It should be noted that although the embodiment has set the implemented first level and second level (respectively logic 1 and logic 0, as depicted hereinbefore), but the present invention is not limited to the above-mentioned implementation. Anyone skilled in the art can modify the above-mentioned implementation; for example, by setting the first level and the second level as logic 0 and logic 1.

In summary, the present invention uses the sensing signal produced by the temperature sensor to control the over-temperature protection unit and further to indirectly control the operations of the reset unit, the voltage converters and the embedded controller. In this way, when the computer system needs to be restarted, more time is required to make the embedded controller work normally. Meanwhile, the computer system wins sufficient time to discharge the second voltage received by the embedded controller and has longer time to dissipate the heat thereof. By using the invented scheme, the present invention is able to avoid the computer system after entering the over-temperature protection mechanism from reiteratively starting operations and the user from having a wrong message that the computer gets fault.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A power control apparatus, used for controlling an embedded controller in a computer system to be enabled or disabled; the power control apparatus comprising:
   a temperature sensor, for sensing a measured temperature and accordingly outputting a sensing signal;
   a first voltage converter, for converting a power voltage of the computer system into a first voltage;
   an over-temperature protection unit, for receiving the first voltage and deciding whether or not to output the first voltage according to the sensing signal;
   a reset unit, electrically connected to the over-temperature protection unit, wherein when the reset unit has received the first voltage from the over-temperature protection unit, the reset unit decides whether or not to produce a reset signal according to the level of the power voltage; and
   a second voltage converter, electrically connected to the reset unit and the embedded controller for producing a start signal to enable the embedded controller according to the reset signal.

2. The power control apparatus as claimed in claim 1, wherein the over-temperature protection unit comprises a switch having a first terminal, a second terminal and a control terminal, wherein the first terminal receives the first voltage, the second terminal is electrically connected to the reset unit and the control terminal is for receiving the sensing signal to decide whether or not the first terminal and the second terminal thereof are conductive according to the sensing signal.

3. The power control apparatus as claimed in claim 1, wherein when the measured temperature is within a safety range of the temperature sensor, the temperature sensor outputs the sensing signal with a first level so that the over-temperature protection unit outputs the first voltage; when the measured temperature is beyond the safety range of the temperature sensor, the temperature sensor outputs the sensing signal with a second level so that the over-temperature protection unit ceases outputting the first voltage.

4. The power control apparatus as claimed in claim 3, wherein the first level is logic 1 and the second level is logic 0.

5. The power control apparatus as claimed in claim 3, wherein the first level is logic 0 and the second level is logic 1.

6. The computer system as claimed in claim 3, wherein the first level is logic 0 and the second level is logic 1.

7. The power control apparatus as claimed in claim 1, wherein the reset unit comprises:
   a first resistor, having a first end and a second end, wherein the first end of the first resistor is for receiving the power voltage and the second end of the first resistor is for generating a first reference voltage;
   a second resistor, having a first end and a second end, wherein the first end of the second resistor is electrically connected to the second end of the first resistor and the second end of the second resistor is for generating a second reference voltage;

a third resistor, having a first end and a second end, wherein the first end of the third resistor is electrically connected to the second end of the second resistor and the second end of the third resistor is electrically connected to a ground terminal; and a reset circuit, electrically connected to the second ends of the first resistor and the second resistor, the over-temperature protection unit and the second voltage converter, wherein the reset circuit is operated with the first voltage so as to respectively compare the first reference voltage and the second reference voltage with a preset voltage in the reset circuit and to decide whether or not producing the reset signal according to the comparison result.

8. The power control apparatus as claimed in claim 1, further comprising:
a third voltage converter, electrically connected to the embedded controller for converting the power voltage of the computer system into a second voltage serving as the operation voltage of the embedded controller.

9. The power control apparatus as claimed in claim 8, wherein the power voltage is greater than the first voltage and the first voltage is greater than the second voltage.

10. The power control apparatus as claimed in claim 8, wherein the second voltage converter further generates a third voltage according to the reset signal and the third voltage is less than the second voltage.

11. A computer system, comprising:
an embedded controller; and
a power control apparatus, electrically connected to the embedded controller for controlling the embedded controller to be enabled or disabled, wherein the power control apparatus comprises:
 a temperature sensor, for sensing a measured temperature and accordingly outputting a sensing signal;
 a first voltage converter, for converting a power voltage of the computer system into a first voltage;
 an over-temperature protection unit, for receiving the first voltage and deciding whether or not to output the first voltage according to the sensing signal;
 a reset unit, electrically connected to the over-temperature protection unit, wherein when the reset unit has received the first voltage from the over-temperature protection unit, the reset unit decides whether or not to produce a reset signal according to the level of the power voltage; and
 a second voltage converter, electrically connected to the reset unit and the embedded controller for producing a start signal to enable the embedded controller according to the reset signal.

12. The computer system as claimed in claim 11, wherein the over-temperature protection unit comprises a switch having a first terminal, a second terminal and a control terminal, wherein the first terminal receives the first voltage, the second terminal is electrically connected to the reset unit and the control terminal is for receiving the sensing signal to decide whether or not the first terminal and the second terminal thereof are conductive according to the sensing signal.

13. The computer system as claimed in claim 11, wherein when the measured temperature is within a safety range of the temperature sensor, the temperature sensor outputs the sensing signal with a first level so that the over-temperature protection unit outputs the first voltage; when the measured temperature is beyond the safety range of the temperature sensor, the temperature sensor outputs the sensing signal with a second level so that the over-temperature protection unit ceases outputting the first voltage.

14. The computer system as claimed in claim 13, wherein the first level is logic 1 and the second level is logic 0.

15. The computer system as claimed in claim 11, wherein the reset unit comprises:
a first resistor, having a first end and a second end, wherein the first end of the first resistor is for receiving the power voltage and the second end of the first resistor is for generating a first reference voltage;
a second resistor, having a first end and a second end, wherein the first end of the second resistor is electrically connected to the second end of the first resistor and the second end of the second resistor is for generating a second reference voltage;
a third resistor, having a first end and a second end, wherein the first end of the third resistor is electrically connected to the second end of the second resistor and the second end of the third resistor is electrically connected to a ground terminal; and
a reset circuit, electrically connected to the second ends of the first resistor and the second resistor, the over-temperature protection unit and the second voltage converter, wherein the reset circuit is operated with the first voltage so as to respectively compare the first reference voltage and the second reference voltage with a preset voltage in the reset circuit and to decide whether or not producing the reset signal according to the comparison result.

16. The computer system as claimed in claim 11, wherein the power control apparatus further comprises:
a third voltage converter, electrically connected to the embedded controller for converting the power voltage of the computer system into a second voltage serving as the operation voltage of the embedded controller.

17. The computer system as claimed in claim 16, wherein the power voltage is greater than the first voltage and the first voltage is greater than the second voltage.

18. The computer system as claimed in claim 16, wherein the second voltage converter further generates a third voltage according to the reset signal and the third voltage is less than the second voltage.

* * * * *